United States Patent
Crane

(10) Patent No.: US 8,499,539 B2
(45) Date of Patent: Aug. 6, 2013

(54) PRODUCING YARN

(75) Inventor: Richard Crane, Tiverton (GB)

(73) Assignee: Heathcoat Fabrics Limited, Tiverton (GB)

(*) Notice: Subject to any disclaimer, the term of this patent is extended or adjusted under 35 U.S.C. 154(b) by 0 days.

(21) Appl. No.: 12/908,971

(22) Filed: Oct. 21, 2010

(65) Prior Publication Data

US 2011/0098147 A1    Apr. 28, 2011

Related U.S. Application Data

(63) Continuation of application No. PCT/GB2009/050391, filed on Apr. 20, 2009.

(30) Foreign Application Priority Data

Apr. 21, 2008  (GB) .................................. 0807219.1

(51) Int. Cl.
    *D02G 3/02*    (2006.01)
(52) U.S. Cl.
    USPC ......................................................... 57/350
(58) Field of Classification Search
    USPC ................... 57/24, 203, 5, 350, 403
    See application file for complete search history.

(56) References Cited

U.S. PATENT DOCUMENTS

| | | | |
|---|---|---|---|
| 3,259,939 A | 7/1966 | Shalko | |
| 3,822,543 A | 7/1974 | Edagawa | |
| 4,698,956 A * | 10/1987 | Clarke et al. | 57/2 |
| 5,497,608 A * | 3/1996 | Matsumoto et al. | 57/207 |
| 2006/0177656 A1 | 8/2006 | Kolmes | |

FOREIGN PATENT DOCUMENTS

| | | |
|---|---|---|
| EP | 0737 763 A | 10/1996 |
| JP | 04 057933 A | 2/1992 |
| WO | WO 03/031700 A | 4/2003 |

* cited by examiner

*Primary Examiner* — Shaun R Hurley

(74) *Attorney, Agent, or Firm* — Marshall & Melhorn, LLC

(57) ABSTRACT

A process for the production of a yarn is disclosed, the process comprising providing a bundle comprising continuous filaments of a thermoplastic polymer, contacting the bundle with a sliver comprising fibers of a heat resistant material to form a mixed bundle, and applying a gas jet to the mixed bundle to distribute the fibers of the heat resistant material in the bundle. Also disclosed are yarns comprising filaments of a thermoplastic polymer and fibers of a heat resistant material, wherein the fibers are distributed between and among the filaments. Preferably, the heat resistant material is a non-thermoplastic polymer, especially an aramid. Yarns according to the invention find use in technical fabrics especially transmission belts.

10 Claims, 3 Drawing Sheets

PRODUCING YARN

RELATED APPLICATION

This application is a continuation of International Application No. PCT/GB2009/050391, filed Apr. 20, 2009, which is incorporated herein by reference.

BACKGROUND OF THE INVENTION

The present invention relates to processes for producing yarn, to yarns produced by the processes, to fabrics comprising the yarn and to transmission belts comprising such fabrics.

Existing transmission or timing belts, when used in engines or the like, are designed with teeth which mesh with appropriate pulleys to provide synchronised power transmission. The transmission belts are formed by pressing a suitable resilient fabric over a mould to mould the teeth and impregnating the fabric with suitable elastomer. Distortion of the teeth during use leads to wear on the belt and is a mode of failure. Additionally, the distortion of the teeth leads to elastic hysteresis, which in turn leads to the build up of heat.

Nylon has usually been chosen as a fabric forming the surface of the belt which contacts the pulleys. Nylon has the advantage of resilience when textured, with good heat and wear resistance, under the temperatures and under the conditions in current engines. However, there is a need for yarns that can be used to form fabrics for transmission belts that are able to withstand higher temperatures and also with enhanced chemical stability because engines in the future are likely to run at higher temperatures to improve efficiency and may also have a more aggressive chemical environment. There is, in any case, a need for transmission belts that do not require replacement during the lifetime of an engine. Yarns contributing to these advantages would also have uses in many other technical fabrics.

There have been attempts to increase the heat or wear resistance of fabrics by incorporating other materials such as PTFE. WO-A-2003/031700 relates to a fabric that can be used in a timing or transmission belt that contains PTFE to reduce friction. In WO-A-2003/031700, a yarn is disclosed having an elastic core thread which is surrounded by a thread comprising a friction reducing substance, e.g. PTFE.

There have also been attempts to use heat and chemical wear resistant polymers such as aramid filament in yarns. Unfortunately, aramid filaments alone have a very high modulus and so are not elastic enough to enable good forming on the mould or be acceptable in use as a transmission belt. A combination of aramid with nylon and elastomer has been attempted, but can introduce further problems because elastomers can degrade leaving voids in the transmission belt that possibly accelerate wear and reduce life. Use of texturised nylon and aramid filament leads to problems on activation (using methods such as scouring) because, after the yarn bulks, the aramid filament is forced out of the bundle causing loops. Loops cause disadvantages including reduced abrasion resistance and hence reduced durability, reduced consistency of the final product, reduction of the dynamic performance of the fabric especially in terms of stretch characteristics and a reduced or inconsistent adhesion performance.

SUMMARY OF THE INVENTION

The present invention aims to address these problems and provide a more heat resistant, wear and chemical resistant yarn for use in technical fabrics.

The present invention accordingly provides a process for the production of a yarn, the process comprising providing a bundle comprising continuous filaments of a thermoplastic polymer, contacting the bundle with a sliver comprising fibres of a heat resistant material to form a mixed bundle, and applying a gas jet to the mixed bundle to distribute the fibres of the heat resistant material in the bundle.

The great advantage of the inventive process is that it enables a mixed bundle of filaments of a thermoplastic polymer together with fibre of a heat resistant material to be produced which overcomes problems associated with the differing properties of the thermoplastic polymer and the heat resistant material, especially after activation. Such a process also provides a great advantage in that the yarns produced by the invention, containing as they do both thermoplastic polymer and fibres of a heat resistant material, can have the advantages both of thermoplastic polymers and heat resistant materials as regards modulus, heat, wear and chemical resistance.

The heat resistant material is preferably selected from glass (e.g. glass fibre), carbon (e.g. carbon fibre) or a non-thermoplastic fibre. The heat resistant material may be a combination of two or more of these material types.

When the heat resistant material is a non-thermoplastic polymer it is preferably selected from aramid, polyamide-imide, polyimide-amide, liquid crystal polymer, PVA, P84, PBI or PTFE. Of these, the preferred non-thermoplastic polymers are aramids (e.g. para-aramid such as Kevlar™ Twaron™, Technora™ or Zylon™ or meta-aramid such as Nomex™, Conex™ and Newstar™).

Aramids, whether para- or meta- are particularly advantageous because of their chemical, heat and wear resistance and exceptional strength.

Preferably, the non-thermoplastic fibre (in particular aramid) is in staple (e.g. break-spun) form.

Preferably, the thermoplastic polymer is texturised. This provides advantages, especially after activation as regards elasticity (which as discussed above in the background to the present invention) is necessary both in use as a technical fabric (in particular a transmission belt) or in the preparation of articles (including transmission belts) by a moulding process.

A great advantage of the present invention is that texturised thermoplastic polymers can be used in combination with heat resistant materials but, after activation, the heat resistant material will not be forced out of the bundle thereby avoiding formation of loops or loose fibres. Because the process involves the preparation of a mixed bundle from a sliver comprising fibres of the heat resistant material (preferably non-thermoplastic polymer such as aramid), after activation the fibres of the heat resistant material tend to overlap rather than being forced out of the yarn. This means that the beneficial properties deriving from the heat resistant material are retained in the yarn even after activation.

Activation is a process involving scouring (i.e. washing in water) and drying and results in bulking of the thermoplastic polymer, especially a texturised thermoplastic polymer. Preferably, the process further comprises at least one activation step.

The thermoplastic polymer may be selected from polyamide, polyester, PBT, poly ether either ketone, poly ether imide or polyolefin (e.g. polyethylene or polypropylene). Of these thermoplastic polymers the currently preferred thermoplastic polymer is polyamide and in particular nylon (for example PA66, PA46 or PA6).

Usually, the bundle of filaments of thermoplastic polymer will be contacted with the sliver after carding and/or combining and during a drawing step (usually on the drawing frame).

After the mixed bundle has been formed, preferably it undergoes at least one further step to produce the finished yarn. This is to improve the distribution of the heat resistant fibre in the final yarn.

In the process of the invention, the mixed bundle preferably comprises the fibres of the heat resistant material in an amount of between 5 and 75% by weight. Less than about 5% by weight will result in less of the beneficial properties of the heat resistant material being apparent in the bundle or the mixed yarn after spinning. At more than about 75% by weight, the benefits of the invention are likewise reduced.

Preferably the fibres of the heat resistant material are comprised in the mixed bundle in an amount above 10, 15, 20, 25 or 30% by weight. Preferably, the mixed bundle comprises the fibres of the heat resistant material in an amount of less than 70, 65, 60, or 55% by weight.

Preferably the thermoplastic yarns are in the range of 33 to 2000 decitex, more preferably in the range of 60 to 1600 decitex.

The process of the present invention is advantageously performed with a fibre of heat resistant material of a length between 10 mm and 200 mm. If the fibres are significantly shorter than 10 mm then the mixed bundle will not necessarily contain significant overlapping of the heat resistant fibres throughout. If fibres of the heat resistant material are significantly longer than 200 mm problems associated with the heat resistant material fibres being forced out of the mixed bundle or yarn can occur.

Preferably the length of fibres of the heat resistant material is above 20, 30, 40 or 45 mm. Preferably, the length of the fibres of the heat resistant material is below 180, 160, 150 or 140 mm.

In a second aspect, the present invention provides a yarn comprising filaments of a thermoplastic polymer and fibres of a heat resistant material, wherein the fibres are distributed between and among the filaments. Beneficial features of the second aspect of the invention are generally the same, with appropriate modification, as those discussed in relation to the first aspect.

Yarns produced by the process of the first aspect of the invention or according to this second aspect of the invention may be used to produce fabrics having the beneficial properties deriving from both the thermoplastic polymer and the heat resistant material. Such fabrics find uses in many areas where technical fabrics are used currently, one of the more important uses will be as a transmission belt comprising the fabric.

BRIEF DESCRIPTION OF THE DRAWINGS

The present invention is illustrated by the following drawings in which.

DETAILED DESCRIPTION OF THE INVENTION

Figure 1:
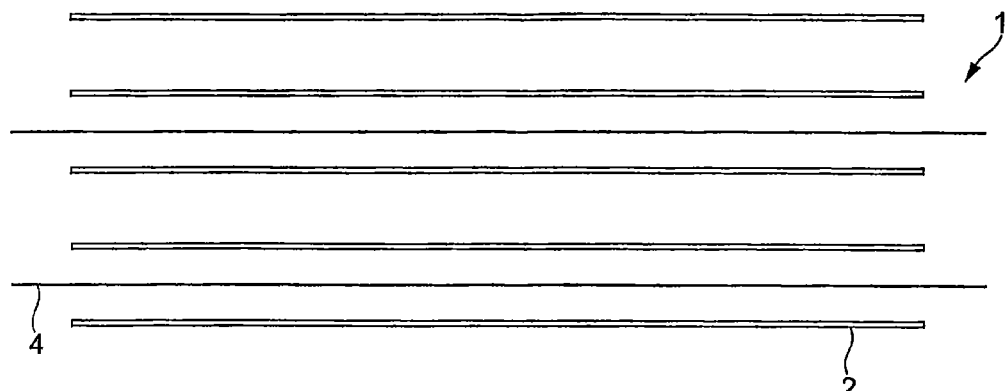
FIG. 1 illustrates schematically a comparative yarn before activation.

FIG. 1 illustrates a comparative yarn 1, which consists of thermoplastic filaments 2 of Nylon 66, and heat resistant material filaments, of para aramid 4. Before activation the filaments of thermoplastic polymer 2 and heat resistant material 4 are well mixed in the yarn.

Figure 2:
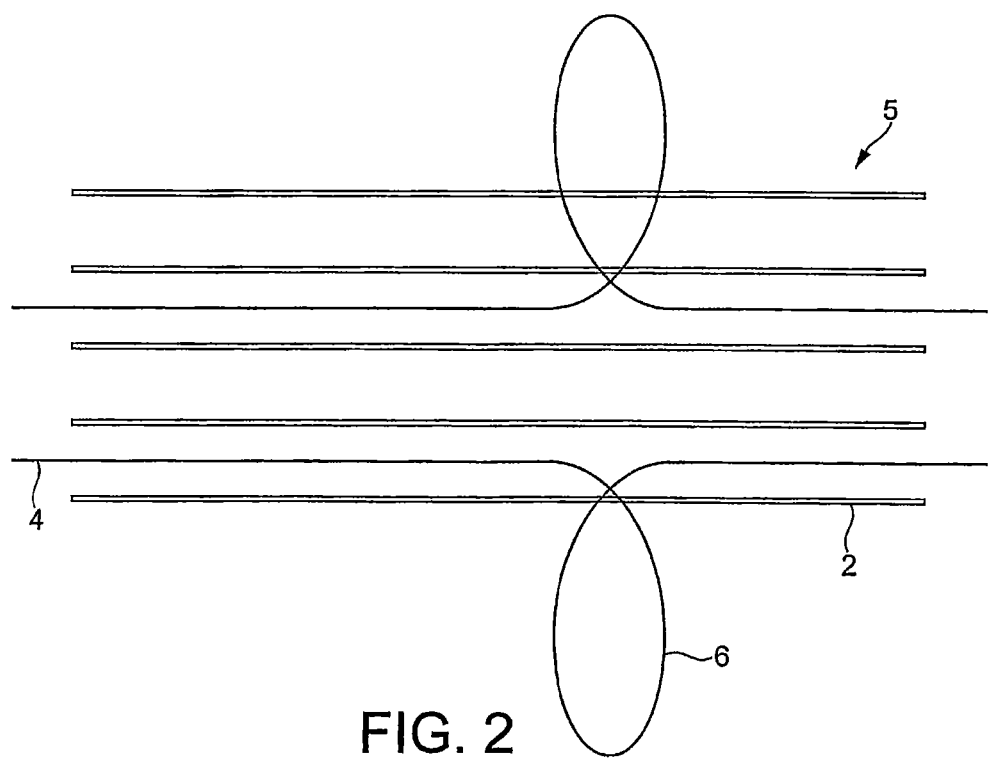
FIG. 2 illustrates schematically the comparative yarn after activation.

FIG. 2 illustrates the comparative yarn 5 after activation (scouring in water and drying). The activation process shrinks and bulks the bundle of thermoplastic polymer filaments 2. However, the heat resistant material filaments 4 do not act in the same way as the thermoplastic filaments 2. Consequently, the heat resistant filaments 4 are forced out of the mixed yarn forming loops 6. Loops 6 cause disadvantages including reduced abrasion resistance and hence reduced durability, reduced consistency of the final product, reduction of the dynamic performance of the fabric especially in terms of stretch characteristics and a reduced or inconsistent adhesion performance.

Figure 3:
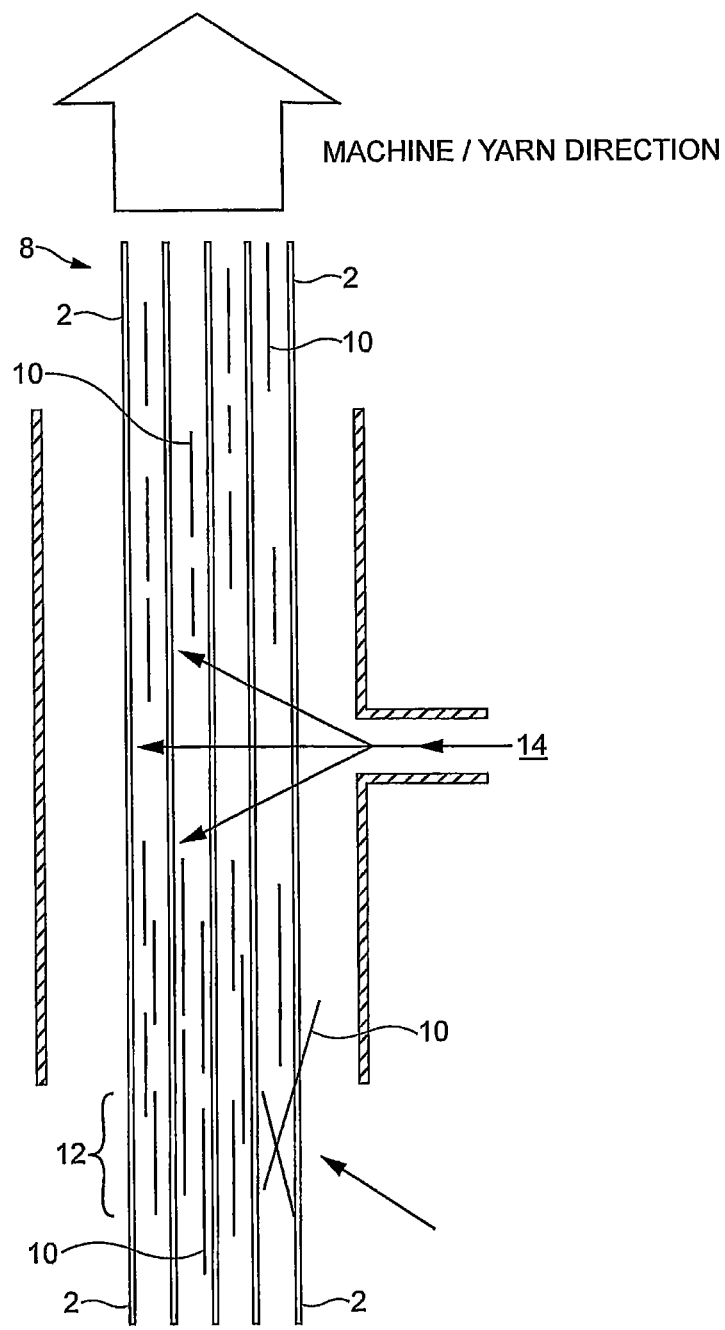
FIG. 3 illustrates the process of the present invention.

FIG. 3 illustrates the process according to the present invention in which a mixed bundle 8 is produced. The mixed bundle is formed of continuous filament 2 of a thermoplastic polymer, Nylon 66, and a sliver (a poorly cohesive bundle of generally coaxial staple fibres of relatively short length, between 10 and 200 mm of break-spun para aramid fibres). The bundle of thermoplastic continuous filaments 2 and the sliver of para aramid fibres 10 are brought together in a drawing step on a drawing frame (not illustrated) before the step illustrated in FIG. 3. After drawing, an unmixed, or poorly mixed, bundle 12 of the para aramid sliver (the fibres 10 of which are still mainly cohering) and the thermoplastic filaments 2 is produced. This unmixed bundle 12 is passed through a tube where a compressed gas jet 14 is applied to the unmixed bundle 12. The effect of the compressed gas jet is to separate the still partly formed sliver of para aramid fibres 10 and to distribute the para aramid fibres 10 in the bundle of thermoplastic filaments 2. The result is a mixed bundle of thermoplastic continuous filaments 2 and para aramid fibres 10 wherein the para aramid fibres are distributed much more evenly between and among the continuous thermoplastic filaments 2.

Figure 4:
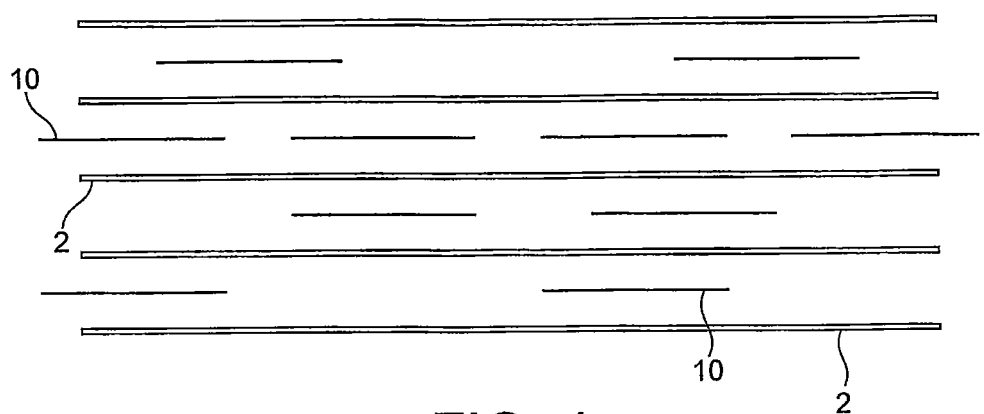
FIG. 4 illustrates schematically the yarn according to the present invention before activation.

FIG. 4 illustrates schematically the yarn produced by the process illustrated in FIG. 3, after spinning but before yarn activation. The yarn comprises continuous filaments 2 of thermoplastic polymer and aramid fibres 10 distributed between and among the filaments 2.

Figure 5:
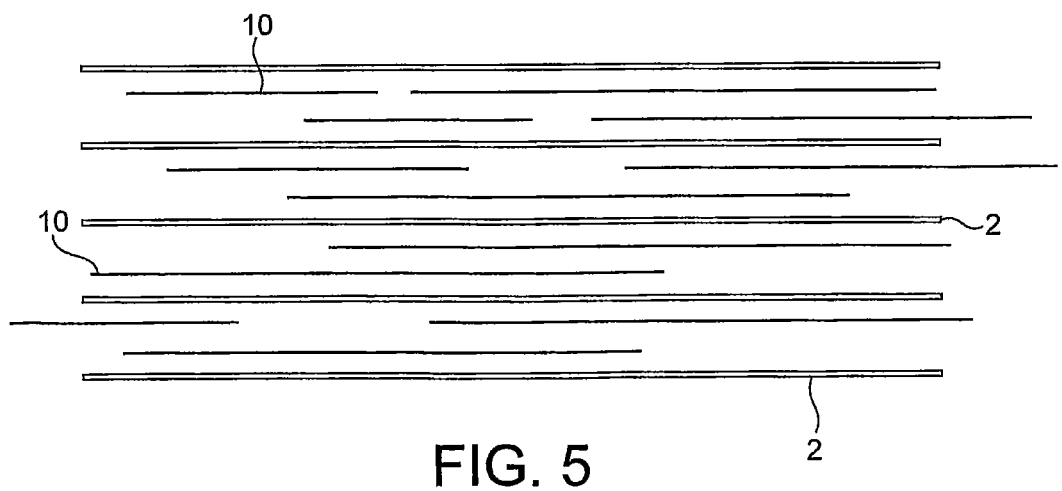
FIG. 5 illustrates the yarn according to the present invention after activation.

FIG. 5 illustrates the situation after activation of the yarn. Activation results in the bundle of the thermoplastic filaments 2 reducing significantly in length and bulking out. As a result of this the aramid fibres 10 come closer together with the result that they overlap in the yarn rather than being forced out into loops 6 as illustrated in FIG. 2. A consequence of this is that the yarn retains beneficial properties of both the thermoplastic polymer and the aramid fibres even after activation.

What is claimed is:

1. A process for the production of a yarn, the process comprising
   providing a bundle comprising continuous filaments of a thermoplastic polymer,
   contacting the bundle with a sliver comprising fibres of a heat resistant material,
   combining the filaments and the sliver in a drawing step to produce a single bundle, and
   applying a gas jet to the single bundle to distribute the fibres of the heat resistant material in the bundle, thereby distributing the fibres between and among the filaments.

2. A process as claimed in claim 1, wherein the heat resistant material is selected from glass, carbon or a non-thermoplastic polymer.

3. A process as claimed in claim 2, wherein the non-thermoplastic polymer is selected from aramid, polyamide-imide, polyimide-amide, liquid crystal polymer, PVA, P84, PBI or PTFE.

4. A process as claimed in claim 2, wherein the thermoplastic polymer is a texturized thermoplastic polymer.

5. A process as claimed in claim 1, further comprising at least one activation step.

6. A process as claimed in claim 1, wherein the thermoplastic polymer is selected from polyamide, polyester, PBT, poly ether ether ketone, poly ether imide or polyolefin.

7. A process as claimed in claim 1, wherein the single bundle comprises the fibres of the heat resistant material in an amount of between 5 and 75% by weight.

8. A process as claimed in claim 1, wherein the filaments of thermoplastic are in the range 33 to 2000 decitex.

9. A process as claimed in claim 1, wherein the length of the fibres of the heat resistant material is between 10 mm and 200 mm.

10. A process as claimed in claim 1, wherein the drawing step is performed on a drawing frame.

* * * * *